United States Patent [19]
Isomura et al.

[11] Patent Number: 5,806,824
[45] Date of Patent: Sep. 15, 1998

[54] VEHICLE SEAT ADJUSTER

[75] Inventors: Tohru Isomura, Hiratsuka; Fumio Miyauchi, Yokohama, both of Japan

[73] Assignee: Ikeda Bussan Co., Ltd., Ayase, Japan

[21] Appl. No.: 614,553

[22] Filed: Mar. 13, 1996

[30] Foreign Application Priority Data

Mar. 13, 1995 [JP] Japan ................................. 7-080699

[51] Int. Cl.⁶ ..................................................... B60N 2/02
[52] U.S. Cl. ...................... 248/396; 248/421; 296/65.1; 297/344.17
[58] Field of Search ................................. 248/419, 421, 248/422, 396; 297/344.13, 344.17, 344.15, 344.2; 296/65.1

[56] References Cited

U.S. PATENT DOCUMENTS

| | | | |
|---|---|---|---|
| 2,827,947 | 3/1958 | Wilkinson | 248/421 X |
| 2,983,545 | 5/1961 | Garvey et al. | 248/421 X |
| 3,167,296 | 1/1965 | Pickles | 248/419 |
| 5,014,958 | 5/1991 | Harney | 248/419 X |
| 5,020,762 | 6/1991 | Hatta . | |
| 5,275,457 | 1/1994 | Satoh et al. | 248/419 X |
| 5,501,422 | 3/1996 | Chinomi | 248/419 |

FOREIGN PATENT DOCUMENTS

| | | |
|---|---|---|
| 1 362 561 | 8/1974 | United Kingdom . |
| 2 032 266 | 5/1980 | United Kingdom . |
| 2 081 082 | 2/1982 | United Kingdom . |
| 2 106 778 | 4/1983 | United Kingdom . |
| 2 141 623 | 1/1985 | United Kingdom . |

*Primary Examiner*—Ramon O. Ramirez
*Assistant Examiner*—Derek J. Berger
*Attorney, Agent, or Firm*—Foley & Lardner

[57] ABSTRACT

A vehicular seat adjuster has a pair of rail units for adjustably sliding a vehicular seat in the fore-and-aft direction and a lifting mechanism for adjustably moving up and down the seat. The lifting mechanism is installed to the rail unit and includes a front lifting section disposed under a front portion of the seat for vertically moving a front portion of a seat according to an operation of a front motor unit and a rear lifting unit disposed under a rear portion of the seat for vertically moving a rear portion of the seat according to an operation of a rear motor unit. The front and rear motor units are swingably supported to a shaft member, which is rotatably supported to the pair of seat rails.

7 Claims, 5 Drawing Sheets

VEHICLE SEAT ADJUSTER

BACKGROUND OF THE INVENTION

1. Field of the Invention

The present invention relates to improvements in a seat adjuster for a vehicular seat, and more particularly to a seat adjuster disposed between a vehicle floor and a vehicular seat to move the seat in the fore-and-aft and the vertical directions.

2. Description of the Related Art

FIG. 7 shows a conventional seat adjuster arranged to move a vehicular seat in the fore-and-aft and vertical directions. The conventional seat adjuster is provided with a front lifter mechanism 2 and a rear lifter mechanism 3, which are installed to a pair of rail units, for moving the seat in the fore-and-aft direction. The front lifter mechanism 2 has a connecting shaft 2a rotatably supported to a device base 1L fixed to the rail unit and a seat rail 1R of the other rail unit. A pair of supporting links 2b and 2c fixed to the connecting shaft 2a are interconnected with the seat. The connecting shaft 2a is rotated by a front drive motor 2h fixed to a bracket 2g through a reduction gear 2f, a pinion gear engaged with the reduction gear 2f and a sector gear 2d fixed to an end portion of the connecting shaft 2a. Similarly, the rear lifter mechanism 3 has a connecting shaft 3a rotatably supported to the rear portions of the device base 1L and the seat rail 1R. A pair of supporting links 3b and 3c fixed to the connecting shaft 3a are interconnected with the seat. The connecting shaft 2a is rotated by a rear drive motor 3g fixed to the bracket 2g through a reduction gear 3h, a pinion gear 3f engaged with the reduction gear 3h, a sector gear 3e rotatably connected to the device base 1L and an interconnecting link 3d swingably interconnected with the supporting link 3b.

However, the fixing of the drive motors 2h and 3g and the reduction gears 2f and 3h through the bracket 2g increases steps in assembling process and degrades the degree of freedom in design.

SUMMARY OF THE INVENTION

It is an object of the present invention to provide an improved vehicular seat adjuster free from the above-mentioned problems.

A seat adjuster according to the present invention is for a vehicular seat and comprises a pair of rail units that adjustably slide on the vehicular seat in the fore-and-aft direction. Each of the rail units includes a floor rail which is fixed on a floor of a vehicle body and a seat rail adapted to be engaged with the floor rail so as to be slidable in the fore-and-aft direction of the vehicle. A seat lifting mechanism is installed to the seat rail. The seat lifting mechanism includes a front lifting section, disposed under a front portion of the seat, to vertically move the front portion of the seat according to an operation of a front motor unit and a rear lifting unit, disposed under a rear portion of the seat and vertically moves the rear portion of the seat according to an operation of a rear motor unit. The front and rear motor units are swingably supported to a shaft member rotatably supported to the pair of seat rails.

With this arrangement, since the motor unit for executing the up and down operations of the lifting section is swingably supported to a shaft member, no fixing bracket is required to install of the motor unit and therefore the weight and production cost thereof is decreased while the layout of the motor unit has a great degree of freedom in the lateral direction.

DETAILED DESCRIPTION OF THE INVENTION

Referring to FIGS. 1 to 4, there is shown a first embodiment of a seat adjuster S according to the present invention.

Figure 1:
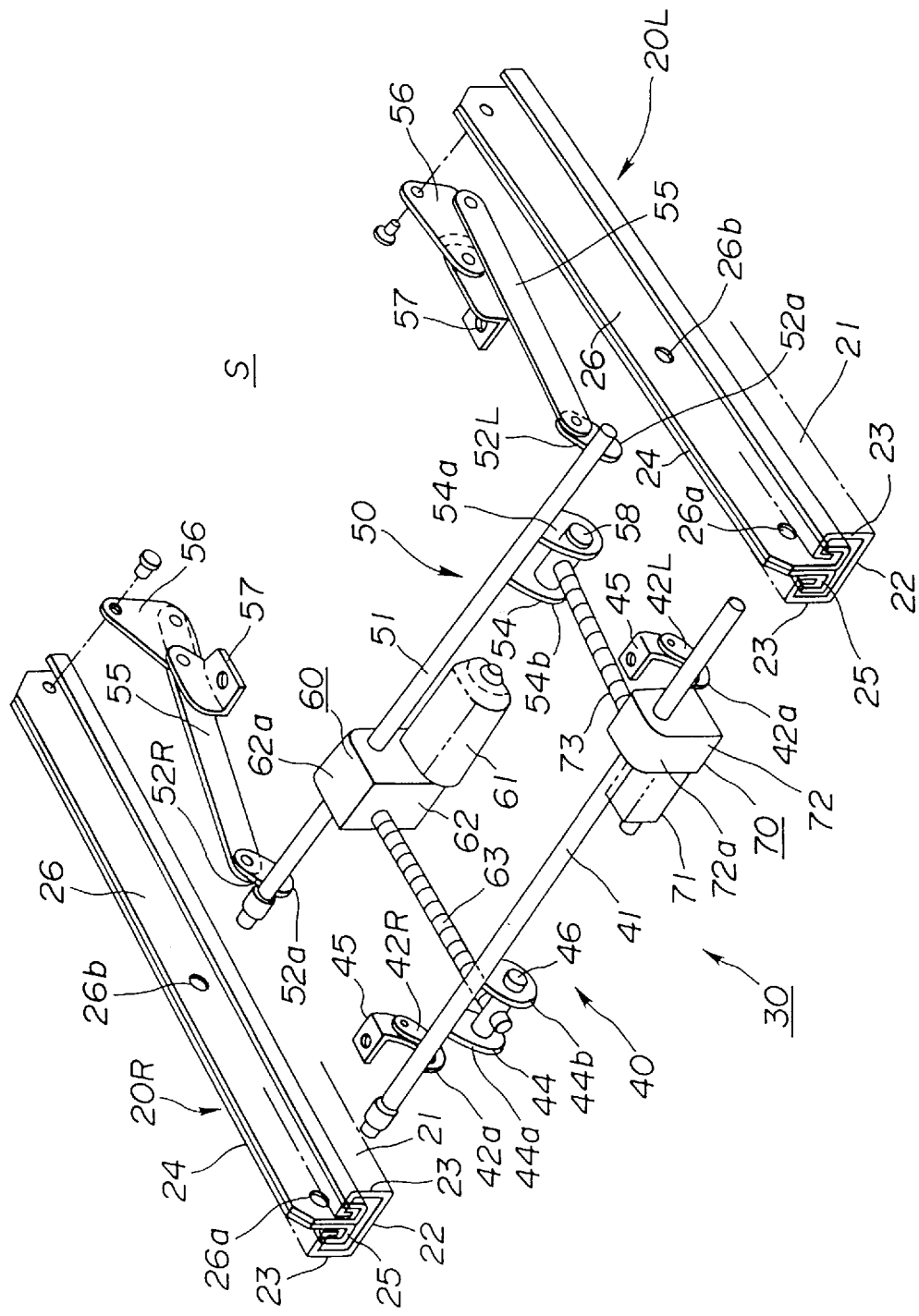
FIG. 1 is a perspective view of a first embodiment of a seat adjuster according to the present invention.

As shown in FIG. 1, the seat adjuster S is for a vehicular seat arranged so that a seat occupant is seated thereon to face frontward of the vehicle. The seat adjuster S comprises a pair of first and second rail units 20L and 20R and a lifting mechanism 30. The lifting mechanism 30 is disposed between the seat and the first and second rail units 20L and 20R so as to vertically move a vehicular seat relative to the rail units 20L and 20R.

Each of the first and second rail units 20L and 20R is constituted by a floor rail 21 fixed to a floor of the vehicle and a seat rail 24 slidably engaged with the floor rail 21 and connected to the seat. The floor rail 21 is formed into a U-shape in cross-section and has a bottom portion 22 and side wall portions 23, 23. The seat rail 24 has a slide contact portion 25 installed in the floor rail 21 and a perpendicular sheet portion 26 standingly connected to the slide contact portion 25. The perpendicular sheet portion 26 has front and rear through-holes 26a and 26b for independently installing front and rear shaft members 41 and 51 of the lifter mechanism 30, in front and rear positions, respectively.

The lifter mechanism 30 is provided with front and rear lifting section 40 and 50 driven by front and rear motor units 60 and 70. The front lifting section 40 is disposed under a front portion of the seat to vertically move the front portion of the seat. The rear lifting section 50 is disposed under a rear portion of the seat to vertically move the rear portion of the seat. The front and rear motor units 60 and 70 are swingably and rotatably supported to the rear and front shaft members, respectively, to drive the front lifting section 40 and the rear lifting section 50.

The front lifting section 40 has the front shaft member 41 made of a hollow pipe laterally disposed between and rotatably supported by the perpendicular sheet portions 26 and 26 of both seat rails 24 and 24. A pair of supporting links 42L and 42R are fixed to both end portions of the front shaft member 41 so as to be swung up and down by the rotation of the front shaft member 41. Each of the supporting links 42L and 42R is formed into a J-shape and has an arc portion 42a fixed to the front shaft member 41 and a free end portion rotatably interconnected with an installation bracket 45. The installation bracket 45 is fixed to a front bottom portion of the seat.

A transfer link 44 is fixed to the front shaft member 41 to rotate the front shaft member 41 by transferring motive force of the front motor unit 60 to the front-shaft member 41. The transfer link 44 is constituted by a pair of supporting plates 44a and 44b which are fixed to the front shaft member 41 at a predetermined interval by means of welding. Between the supporting plates 44a and 44b, a shaft 46 having a tapped hole is rotatably supported.

Similarly, the rear lifting section 50 has a rear shaft member 51 made of a hollow pipe laterally disposed between and rotatably supported to the perpendicular sheet portions 26 and 26 of both seat rails 24 and 24. A pair of supporting links 52L and 52R are fixed to both end portions of the rear shaft member 51 so as to be swung up and down by the rotation of the rear shaft member 51. Each of the supporting links 52L and 52R is formed into a J-shape and has an arc portion 52a fixed to the rear shaft member 51, and a free end portion rotatably interconnected with an end of a connecting rod 55. The other end of the connecting rod 55 is connected to a link 56 swingably supported to a rear end portion of the perpendicular sheet portion 26 by means of a connecting pin 56a.

A transfer link 54 is fixed to the rear shaft member 51 to rotate the rear shaft member 51 by transferring motive force of the rear motor unit 70 to the rear shaft member 51. The transfer link 54 is constituted by a pair of supporting plates 54a and 54b fixed to the rear shaft member 51 at a predetermined interval by means of welding. Between the supporting plates 44a and 44b, a shaft 58 having a tapped hole is rotatably supported.

Figure 2:
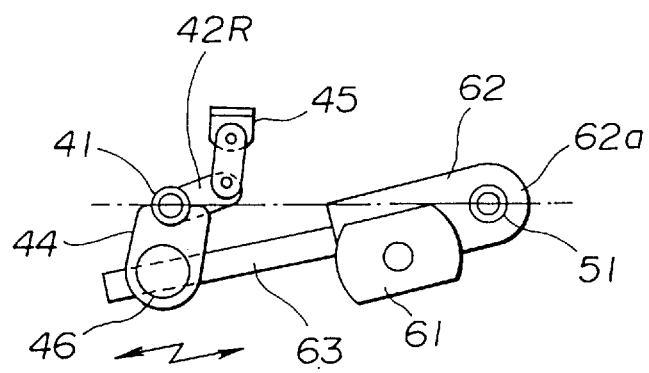
FIG. 2 is a sectional view showing a front lifting section of the first embodiment of FIG. 1.

As shown in FIGS. 1 and 2, the front motor unit 60 is constituted by a front drive motor 61, a reduction gear 62 and a screw shaft 63. The reduction gear 62 is connected to an output end of a front drive motor 61. The reduction gear 62 has a case body 62a rotatably connected to an outer side of the rear shaft member 51 of the rear lifting section 50. The screw shaft 63 extending forward is connected to an output side of the reduction gear 62. A front end portion of the screw shaft 63 is screwed into the tapped hole of the shaft 46.

A supporting position where the case body 62a of the reduction gear 62 is supported to the rear shaft member 51 is located on an extended line of the axis of the screw shaft 63. By rightly and reversely rotating the front drive motor 61, the screw shaft 63 is rightly and reversely rotated and the front shaft member 41 is rightly and reversely rotated through the transfer link 44.

Figure 3:
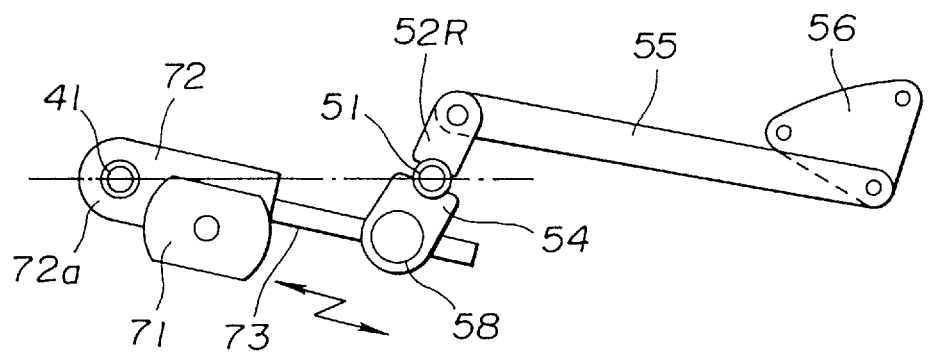
FIG. 3 is a sectional view showing a rear lifting section of FIG. 1.

As shown in FIGS. 1 and 3, the rear motor unit 70 is constituted by a rear drive motor 71, a reduction gear 72 and a screw shaft 73. The reduction gear 72 is connected to an output end of the rear drive motor 71 to be integrally formed. A case body 72a of the reduction gear 72 is rotatably and swingably supported to an inner side of the front shaft member 41 of the front lifting section 40. The screw shaft 73 extending rearward is connected to an output side of the reduction gear 72. A rear end portion of the screw shaft 73 is screwed into the tapped hole of the shaft 58.

A supporting position where the case body 72a is supporting the front shaft member 41, is located on an extended line of the axis of the screw shaft 73. By rightly and reversely rotating the rear drive motor 71, the screw shaft 73 is rightly and reversely rotated and the rear shaft member 51 is rightly and reversely rotated through the transfer link 54.

The operation of the first embodiment of the seat adjuster according to the present invention will be discussed hereinafter.

As shown in FIG. 1, by sliding the seat rails 24 and 24 relative to the floor rails 21 and 21, the seat (not shown), which is fixedly supported to the installation brackets 45, 45, 57 and 57, is slid in the fore-and-aft direction of the vehicle with the lifter mechanism 30, so that the front and rear position of the seat is freely adjusted at a desired position relative to the vehicle floor in the fore-and-aft direction.

The front lifting section 40 of the lifter mechanism 30 is arranged such that when the front drive motor 61 of the front motor unit 60 is rotated such as in the right direction, the screw shaft 63 is rotated in the right direction. Since the shaft 46 is moved rearward according to the right directional rotation of the screw shaft 63, the transfer link 44 is rotated with the front shaft member 41 in the anticlockwise direction in FIG. 2. According to this anticlockwise rotation of the front shaft member 41, the supporting links 42L and 42R are swung upward, and the installation bracket 45 is moved upward. Accordingly, the front portion of the seat is moved up.

When the transfer link 44 is swung around the front shaft member 41, the shaft 46 is moved on a locus of a circular arc shape to change the inclined angle of the screw shaft 63. Since the case body 62a of the reduction gear 62 is rotatably and swingably supported to the rear shaft member 51, the change of the inclined angle of the screw shaft 63 is executed by swinging the reduction gear 62. If the front drive motor 61 is reversely rotated, the front portion of the seat is moved down.

Similarly, the rear lifter portion 50 is arranged such that when the rear drive motor 71 of the rear motor unit 70 is rotated, for example, in the right direction, the screw shaft 73 is rotated in the right direction. Since the shaft 58 is moved rearward according to the right directional rotation of the screw shaft 73, the transfer link 54 is rotated with the rear shaft member 51 in the anticlockwise direction as shown in FIG. 3. According to this anticlockwise rotation of the rear shaft member 51, the link 56 is swung in the clockwise direction around the pin 56a through the connecting link 55, and the installation bracket 57 is moved upward. Therefore, the rear portion of the seat connected to the installation bracket 57 is moved up.

Since the case body 72a of the reduction gear 72 is rotatably and swingably supported to the front shaft member 41, the change of the inclined angle of the screw shaft 73 is executed by swinging the reduction gear 72. If the rear drive motor 71 is reversely rotated, the rear portion of the seat is moved down.

Accordingly, by simultaneously driving the front drive motor 61 and the rear drive motor 71 in the same direction, the seat is wholly moved up or down. Further, by independently driving them, the front and rear inclination of the seat is freely adjusted.

With the first embodiment according to the present invention, since the front motor unit 60 and the rear motor unit 70, which respectively execute the up and down operations of the front lifting section 40 and the rear lifting section 50, are rotatably and swingably supported to the rear shaft member 51 and the front shaft member 41, respectively, no fixing bracket is required and it is possible to decrease weight and production cost while the layout of each motor unit 60, 70 has a great degree of freedom in the lateral direction. Furthermore, since each motor unit 60, 70 is disposed under the seat, no part projects outwardly of the seat and no part affects outlook of the seat. In addition, the outlook of the seat is improved by the easiness of lateral cloth trim treatment.

Figure 4:
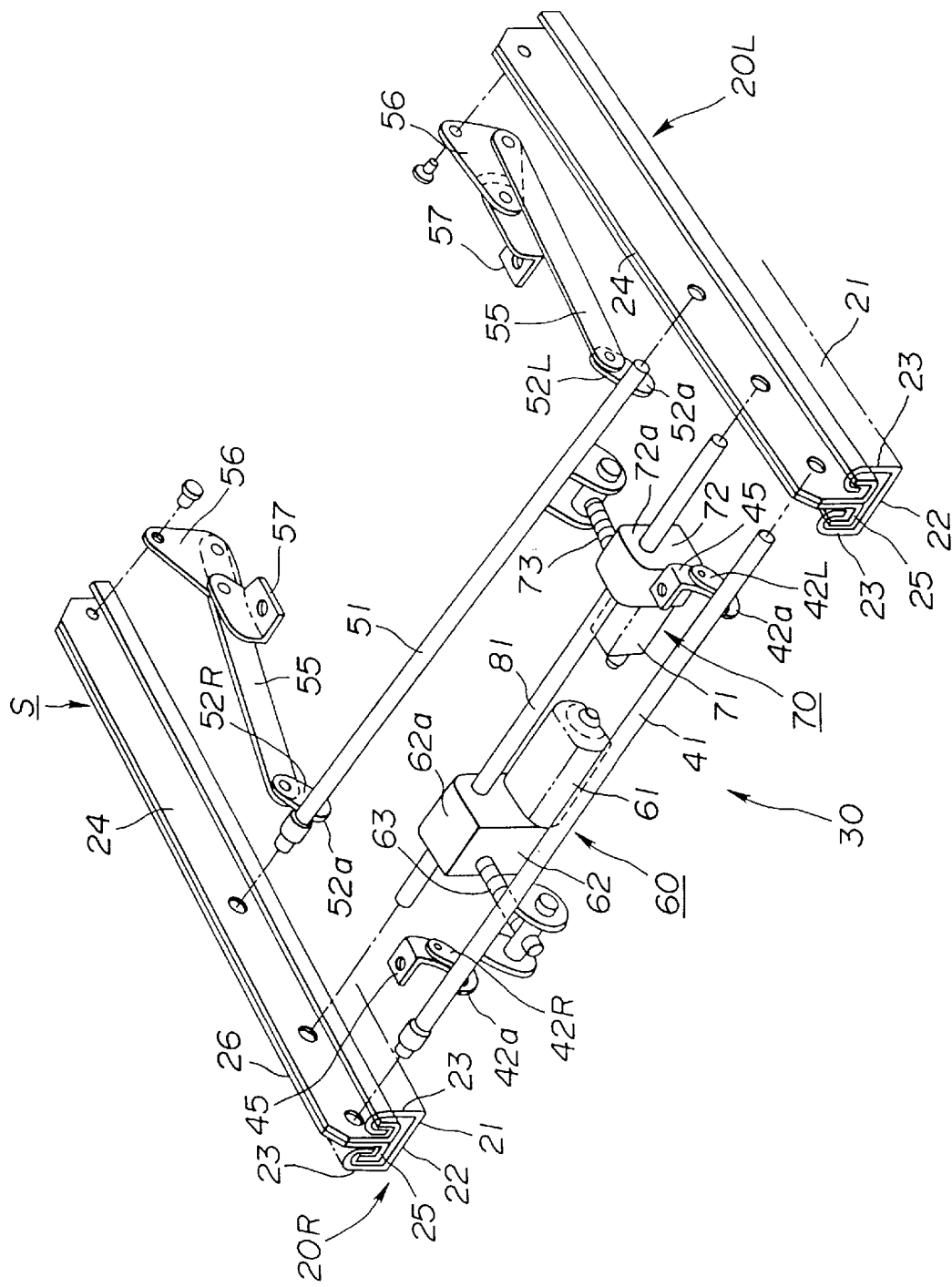
FIG. 4 is a perspective view of a second embodiment of the seat adjuster according to the present invention.
Figure 5:
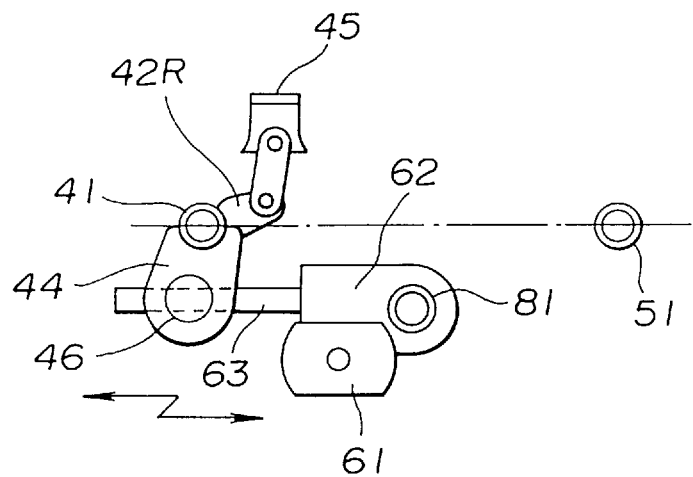
FIG. 5 is a sectional view showing a front lifting section of the second embodiment of FIG. 4.
Figure 6:
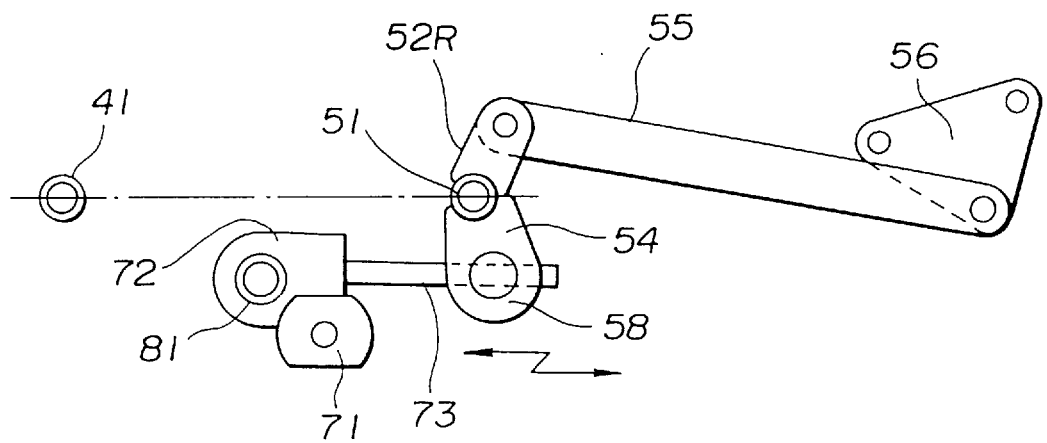
FIG. 6 a sectional view showing a rear lifting section of FIG. 4.

Referring to FIGS. 4 to 6, there is shown a second embodiment of the seat adjuster according to the present invention. The second embodiment is generally similar to the first embodiment except that installed positions of the motor units are different from those of the first embodiment. In the second embodiment, the same parts as the first embodiment are designated by the same numerals and the explanation thereof is omitted.

As shown in FIG. 4, the front motor unit 60 and the rear motor unit 70 are rotatably and swingably supported to an intermediate shaft member 81 disposed between the front and rear shaft members 41 and 51 and supported to the perpendicular sheet portions 26 and 26 of the seat rails 24 and 24 of the rail units 20L and 20R.

In operation of the second embodiment, by rightly (or reversely) driving the front drive motor 61 of the front motor unit 60, the shaft 46 is moved rearward (or forward) and the shaft member 41 is rotated in the anticlockwise direction (or clockwise direction) as shown in FIG. 5. Therefore, it is possible to move the front portion of the seat cushion up (or down).

Similarly, by rightly (or reversely) driving the rear drive motor 71 of the front motor unit 70, the shaft 58 is moved rearward (or forward) and the rear shaft member 51 is rotated in the anticlockwise direction (or clockwise direction) as shown in FIG. 6. Therefore, it is possible to move the rear portion of the seat cushion up (or down).

With the second embodiment, although the number of parts corresponding to the intermediate shaft member 81 for supporting the motor units is increased, the installation of the intermediate shaft member 81 at the intermediate portion between the front shaft member 41 and the rear shaft member 51 enables to shorten the length of the screw shafts 63 and 73 of the front motor unit 60 and the rear motor unit 70. This cancels the increase amount of the shaft member 81. Further, the screw shaft 63 and 73 are increased in the bending rigidity by shortening the length thereof, and therefore it becomes possible to ensure further secure operation.

Although the first and second embodiments have been shown and described such that the case bodies 62a and 72a of the reduction gears 62 and 72 are directly supported to the shaft members 41 and 51 of 81, the invention is not limited to these embodiments and may be arranged to be indirectly supported to the shaft member through an installation bracket and the like. Furthermore, the front and rear drive motors 61 and 71 may be supported to this. That is, any position of the front and rear motor units 60 and 70 may be connected thereto.

Figure 7:
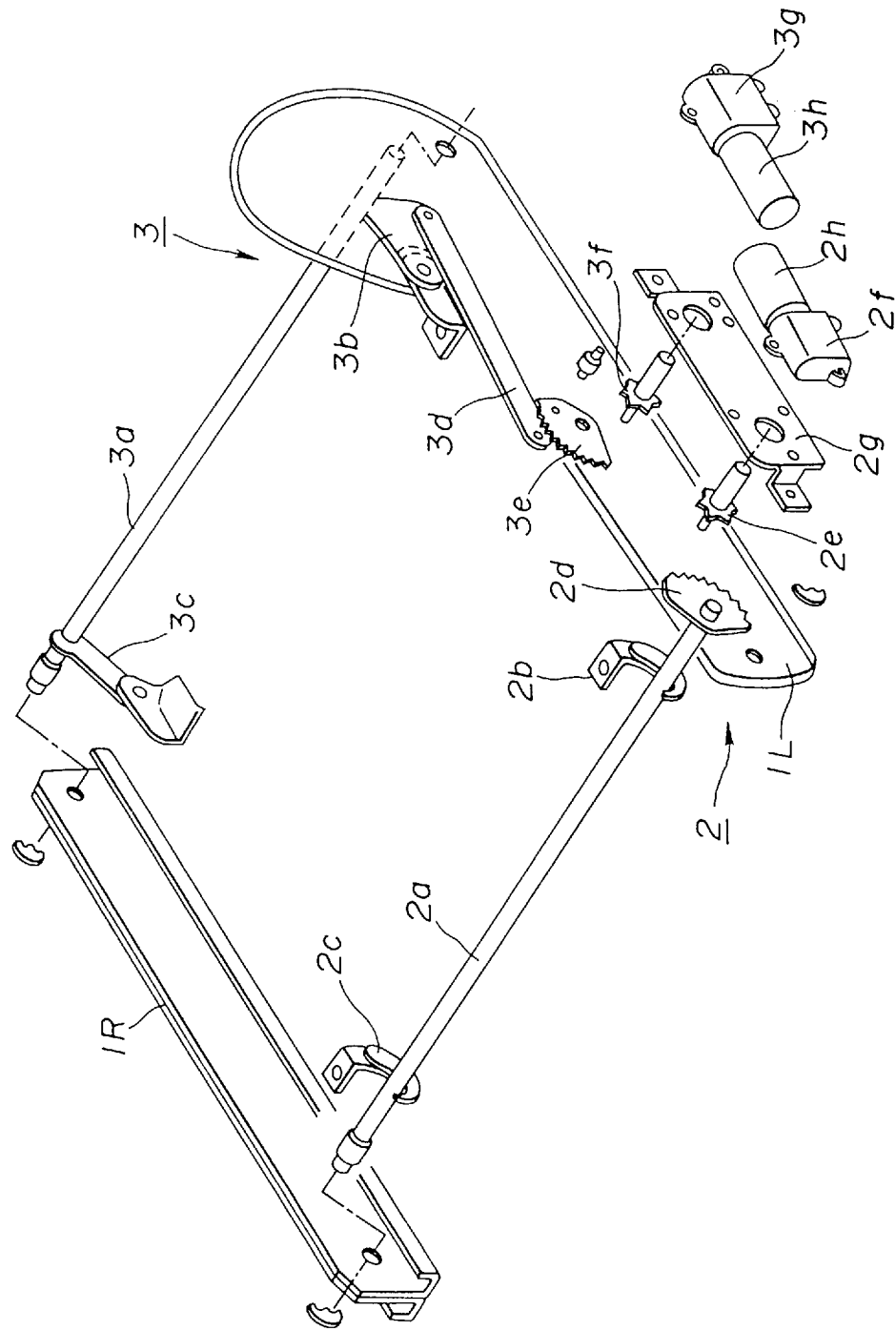
FIG. 7 is an exploded perspective view of a conventional seat adjuster.

While the first and second embodiments have been shown and described such that the perpendicular sheet portion 26 is formed as a part of the seat rail 24, the invention is not limited to this and may be applied to a case where the device base is fixed similar to the conventional example of FIG. 7.

Further, although the first and second embodiments have been shown and described such that the front lifting section 40 and the rear lifting section 50 have different link structures, the invention is not limited to this and may be arranged such that the structure of the rear lifting section 50 is completely the same as that of the front lifting section 40. In such case, it is necessary to move the rear shaft member 51 rearward and therefore it is preferable to arrange as in the second embodiment.

While preferred embodiments of the invention have been illustrated and described in detail, it will be understood that various changes and modifications may be made in the disclosed embodiment without departing from the scope and spirit of the invention as defined in the appended claims.

What is claimed is:

1. A seat adjuster for a seat of a vehicle, comprising:
   a pair of rail units adapted to adjustably slide the seat in the fore-and-aft direction, each of said rail units including a floor rail adapted to be fixed to a floor of the vehicle and a seat rail engaged with said floor rail so as to be slidable in the fore-and-aft direction of the vehicle; and
   a seat lifting mechanism installed on the seat rail, said seat lifting mechanism including a front lifting section for being disposed under a front portion of the seat and a front motor unit for vertically moving the front portion of the seat and a rear lifting section for being disposed under a rear portion of the seat and a rear motor unit for vertically moving the rear portion of the seat; and
   at least one shaft member rotatably supported to the seat rails.
   wherein the front and rear motor units are swingably supported to said at least one shaft member and each of the front and rear motor units has an electric motor, a reduction gear interconnected to the electric motor through the reduction gear, the reduction gear being swingably supported to the respective shaft member.

2. A seat adjuster as claimed in claim 1, wherein said at least one shaft member comprises a front shaft member disposed at the front lifting section and a rear shaft member disposed at the rear lifting section, wherein the front motor unit is swingably supported to the rear shaft member and the rear motor unit is swingably supported to the front shaft member.

3. A seat adjuster as claimed in claim 2, wherein the floor rail has a bottom portion and side wall portions forming a U-shaped cross-section and the seat rail has a slide contact portion slidably connected to the floor rail and a perpendicular sheet portion extending from the slide contact portion, the perpendicular sheet portion having front and rear through-holes for independently connecting the front and rear shaft members.

4. A seat adjuster as claimed in claim 3, further including a pair of supporting links of a J-shape connected to end portions of each shaft members wherein the rotation of the shaft member swings the supporting links up and down to move the seat up and down.

5. A seat adjuster as claimed in claim 2, further comprising a front screw shaft extending from the reduction gear of the front motor unit, a front transfer link fixedly connected to the front shaft member, and a first shaft with a tapped hole for receiving one end of the front screw shaft rotatably supported to the front transfer link and a rear screw shaft extending from the reduction gear of the rear motor unit, a rear transfer link fixedly connected to the rear shaft member, and a second shaft with a tapped hole for receiving one end of the rear screw shaft rotatably supported to the rear transfer link.

6. A seat adjuster as claimed in claim 5, wherein the reduction gear of the front motor unit is supported to the rear shaft member at a position located on an extended line of the axis of the front screw shaft and the reduction gear of the rear motor unit is supported to the front shaft member at a position located on an extended line of the axis of the rear screw shaft.

7. A seat adjuster as claimed in claim 1, wherein said at least one shaft member comprises an intermediate shaft disposed between the front and rear lifting sections and rotatably supported to the seat rails, the front motor unit and the rear motor unit each being swingably supported to said intermediate shaft member.

* * * * *